United States Patent [19]
Lebby et al.

[11] Patent Number: 5,408,547
[45] Date of Patent: Apr. 18, 1995

[54] OPTICAL READ/WRITE HEAD

[75] Inventors: Michael S. Lebby, Apache Junction; Christopher K. Y. Chun, Mesa, both of Ariz.

[73] Assignee: Motorola, Inc., Schaumburg, Ill.

[21] Appl. No.: 19,728

[22] Filed: Feb. 19, 1993

[51] Int. Cl.⁶ ............................. G02B 6/00; H01J 3/14
[52] U.S. Cl. ....................................... 385/14; 250/216
[58] Field of Search ................. 385/36, 37, 9–14; 250/216

[56] References Cited

U.S. PATENT DOCUMENTS

| | | | |
|---|---|---|---|
| 4,172,646 | 10/1979 | Matsumoto | 354/56 |
| 4,215,924 | 8/1980 | Matsumoto | 385/36 X |
| 4,924,082 | 5/1990 | Opheij et al. | 250/216 |
| 4,940,890 | 7/1990 | Opheij et al. | 250/216 |

*Primary Examiner*—Akm E. Ullah
*Attorney, Agent, or Firm*—Eugene A. Parsons

[57] ABSTRACT

An optical read/write head including a cladding layer defining a plurality of parallel, spaced apart optical cores extending therethrough, the cladding layer and cores defining optical input/output surfaces for each optical core and diffraction elements positioned in overlying relationship with the optical input/output surfaces for each optical core. Two rows of the cores being utilized to carry light from sources and the diffraction elements diffracting the light at an angle onto a document, the light reflecting from the document into a third row of cores having diffraction elements that collimate and focus the light onto light detectors.

15 Claims, 4 Drawing Sheets

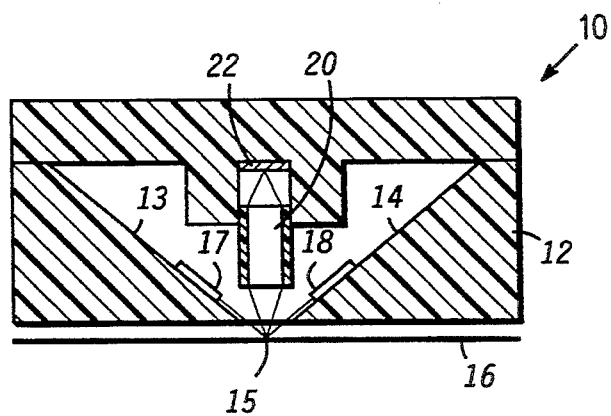
FIG. 1
-PRIOR ART-
FIG. 2
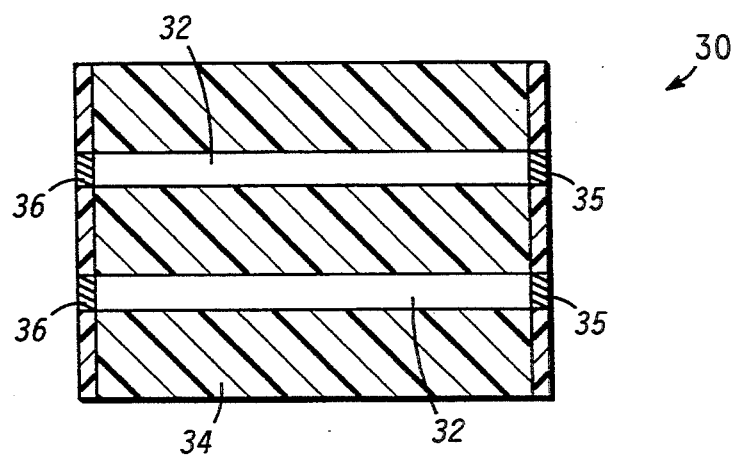
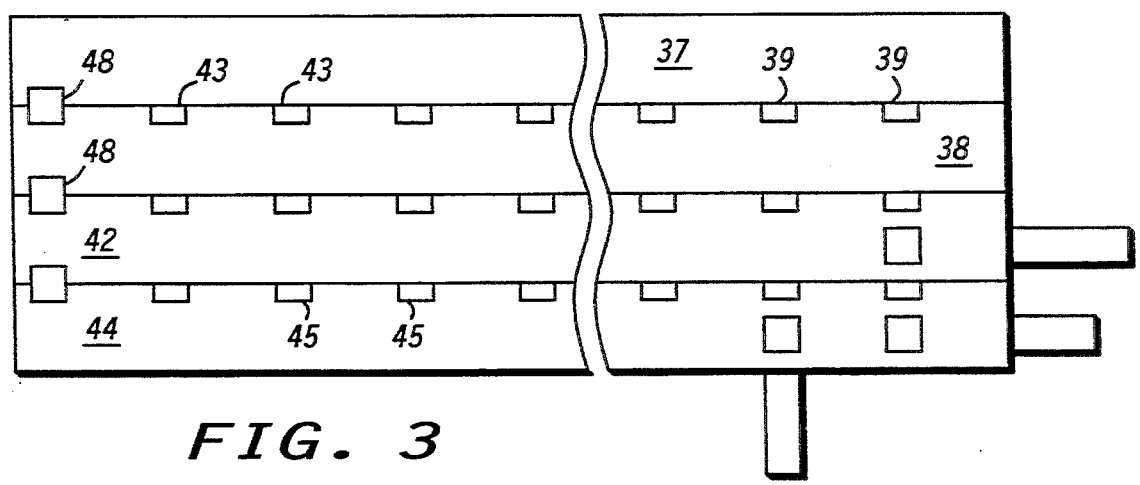
FIG. 3

OPTICAL READ/WRITE HEAD

FIELD OF THE INVENTION

The present invention pertains to optical read/write heads and more specifically to optical read/write heads including molded optical waveguides.

BACKGROUND OF THE INVENTION

Typically, read/write heads for machines, such as facsimile machines and the like, require some illumination source for directing light onto an image, for example on a paper. Light sensors are positioned adjacent the light source to receive reflected light from the image and determine whether a particular pixel of the image is dark or light.

In facsimile machines, the image (sheet of information to be sent) is read and converted to electrical signals one line at a time. Standard facsimile machines break the single line into 1728 or 2560 bits of information, or pixels of light. Thus, for a facsimile machine to read an entire line of information a line of 1728 or 2560 light sources and light sensors are required. Further, the components must be placed together close enough to read a line on a standard sheet of paper, e.g., 8.5×11 inches.

Generally, the prior art utilizes an LED array for the light source, which array must be mounted at an angle to reflect light from the surface of the paper onto the light sensors. For light sensors the prior art utilizes a self-focusing gradient index fiber array and a contact type of image sensor or photo-detector. The self focusing gradient index fiber array is very expensive and difficult to construct, since it must focus reflected light from the surface of the paper (image) to the light sensors. Manufacturing the entire head is very labor intensive and, therefore, very expensive.

SUMMARY OF THE INVENTION

It is a purpose of the present invention to provide a new and improved read/write head for facsimile machines, copy machines and the like.

It is a purpose of the present invention to provide a new and improved read/write head which is simpler, more efficient and more reliable to manufacture.

It is a purpose of the present invention to provide a new and improved read/write head which is much more inexpensive to manufacture and which requires less, or no, manual labor.

The above problems and others are solved and the above purposes and others are realized in an optical read/write head including a cladding layer defining a first plurality of parallel, spaced apart channels therethrough, each channel containing an optical core and forming with the cladding layer a first plurality of parallel optical waveguides, the cladding layer and optical cores defining first and second ends with an optical input/output surface for each optical core positioned in each of the first and second ends, and diffraction elements positioned in overlying relationship with the optical input/output surfaces for each optical core in at least one of the first and second ends.

Further, the above problems and others are solved and the above purposes and others are realized in a method of producing an optical read/write head including the steps of forming a cladding layer so as to define a first plurality of parallel channels therethrough, each channel being filled with an optical core, the cladding layer and optical cores being formed to define a first plurality of optical waveguides with first and second ends and an optical input/output surface for each optical core positioned in each of the first and second ends, forming a plurality of diffraction elements, and positioning the plurality of diffraction elements in overlying relationship with the optical input/output surfaces for each optical core in at least one of the first and second ends.

BRIEF DESCRIPTION OF THE DRAWINGS

Referring to the drawings:

FIG. 1 is a simplified cross-sectional view of a prior art read head for a facsimile machine;

FIG. 2 is a sectional view of an optic array in accordance with the present invention;

FIG. 3 is a view in top plan, portions thereof broken away, of the optic array of FIG. 2, portions thereof removed to better illustrate the construction thereof;

DESCRIPTION OF THE PREFERRED EMBODIMENTS

Figure 4:
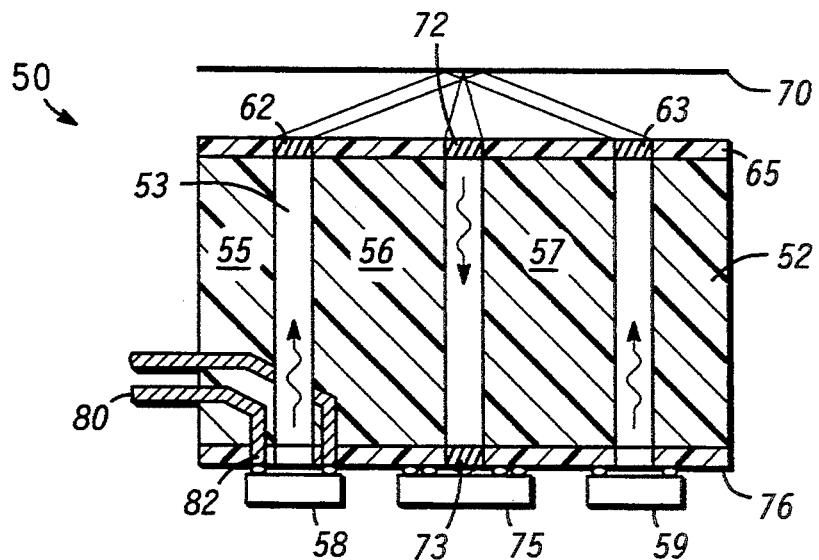
FIG. 4 is a cross-sectional view of a read/write head incorporating an optic array similar to that of FIG. 2, in accordance with the present invention.

Referring specifically to FIG. 1, a simplified cross-sectional view of a prior art read head 10 for a-facsimile machine is illustrated. Head 10 includes a base 12 with a pair of opposed surfaces 13 and 14 positioned to form a 45 degree angle with a line, designated 15, on an image or document 16. Line 15 is the line of document 16 being read or Converted to electrical signals. Two arrays of light emitting diodes (LEDs) 17 and 18 are positioned on surfaces 13 and 14, respectively, to illuminate line 15 and direct reflected light upwardly from line 15 generally perpendicular to document 16. A self-focusing gradient index fiber optic array 20 is positioned in base 12 directly above line 15 so as to receive light from arrays 17 and 18 reflected by document 16. Fiber optic array 20 includes an optical fiber for each pixel in the line and each fiber focuses reflected light from document 16 onto a contact type of image sensor or photodetector 22. It can readily be appreciated that array 20 is very difficult and expensive to manufacture. Also, mounting LED arrays 17 and 18 at the correct angle and spacing is time consuming, expensive and very labor intensive.

Referring to FIG. 2, an improved optic array 30 in accordance with the present invention is illustrated. Array 30 includes a plurality of molded optical waveguides each including a core 32 surrounded (except for the end surfaces) by cladding layer 34. Molded optical waveguides can be manufactured conveniently by a variety of methods, a first notable method being disclosed in a copending U.S. patent application entitled "Molded Waveguide and Method For Making Same", bearing Ser. No. 07/889,335, and filed May 28, 1992, now U.S. Pat. No. 5,265,184.

In this first method, first and second cladding layers are made by injecting a transparent epoxy molding compound, available under the Tradename HYSOL MG18 from Dexter Corporation, into a pair of molds. Temperature of the molds ranges between 150° C. to 175° C. with a preferred temperature range from 160 degrees Celsius to 165 degrees Celsius. Molding pressure of the molds ranges between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to 2 to 4 minutes at a temperature of 175° C. Upon completion of the curing time, the first and second cladding layers are removed from the molds. Typically, a post-curing step is performed in order to achieve maximum physical and electrical properties of the HYSOL material. The post-curing step generally proceeds at 150 degrees Celsius for approximately 2 to 4 hours. Completion of the post-curing step results in the first and second cladding layers having a refractive index of approximately 1.52.

Once the molding and curing processes, as well as the removal of the first and second cladding layers from their respective molds have been completed, the first and second cladding layers are ready to be assembled. Assembly of the first and second cladding layers is achieved by applying an optically clear adhesive with a refractive index at least 0.01 higher than the first and second cladding layers to one of the surfaces to be joined. In a preferred embodiment of the present invention, these requirements are fulfilled by applying an optically clear epoxy available under a Tradename EPO-TEK 301-2 from EPOXY TECHNOLOGY INC. After the adhesive is applied to the surface of the first cladding layer, the surface of the second cladding layer is compressed against the surface containing the adhesive, thereby squeezing and the filling channels and adhering both of the first and second cladding layers together. Curing times for the adhesive epoxy is dependent upon temperature, e.g., at room temperature curing time is 2 days and at 80 degrees Celsius curing time is 1.5 hours.

Typically, the molded first and second cladding layers are joined by anoptically transparent material which forms the core of the waveguide and acts as an adhesive or an optically transparent polymer. The optically transparent adhesive generally may be any of several materials, such as epoxies, plastics, polyimides, or the like. Generally, refractive indexes of these optically transparent materials range from 1.54 to 1.58. It should be understood that to form an optical waveguide the refractive index of the core must be at least 0.01 greater than that refractive index of the cladding layers. Application of the adhesive is done so as to completely fill the channels defined by the first and second cladding layer, thereby forming the optical core. Further, by having the core completely surrounded by the cladding layers, the optical waveguide has superior performance characteristics for conducting light or light signals.

A second method for molding optical waveguides is disclosed in a copending U.S. Patent application entitled "Molded Waveguide with a Unitary Cladding Region and Method of Making", filed of even date herewith and assigned to the same assignee. In this second method the cores are molded separately. The molded cores are then held in place in a larger mold by means of removable extrusions on the ends thereof. With the cores held fixedly in place, the mold is filled to form a unitary cladding layer completely surrounding the cores, except for the ends. The materials and much of the procedure is basically the same as described above in relation to the first molding method.

FIG. 2 further illustrates a layer of optically transparent material containing a diffraction element 35 overlying the end surface of each core 32 of the plurality of waveguides. Another layer at the opposite ends of the waveguides also contains a diffraction element 36 overlying the opposite end of each core 32 of the plurality of waveguides. As will be explained presently, depending upon the use of the waveguide, the diffraction elements 35 and 36 may be utilized cooperatively to receive light in one end of a core 32 and focus the light emanating from the other end onto a light detector or the like. In some applications a light source may be provided at one end of the core 32 and a single diffraction element 35 or 36 may be utilized to change the direction of light emanating from the opposite end.

In one specific embodiment of array 30, a layer of transmissive holographic material is affixed in overlying relationship to the end surface thereof. The transmissive holographic material can include photopolymer recording film of a type which may be purchased from, for example, DuPont De Nemours, Inc. under the trademark OmniDex, film 600 or film 610, a layer of dichromated gelatin (commonly known as DCG), etc. To produce the desired diffraction element, in one specific method, a beam of collimated light from a source, such as a laser or the like is directed onto a beam splitter formed of an isosceles triangle which, in conjunction with four mirrors is utilized to provide a desired interference pattern on the holographic film. The beam is generally from a single frequency light source, such as an argon laser. The interference pattern exposes the holographic film to different intensities of light and the index of refraction of the holographic film differs in accordance with the intensity of light to which it is exposed. Thus, gratings, Fresnel lenses, or other desirable diffraction elements are formed by the different indexes of refraction.

In the formation of gratings, specifically, the angle at which the direct and reflected beams strike the surface of the holographic film determines the angle of the gratings that are formed in the holographic film. Once the holographic film is properly exposed to form the desired gratings therein, the film is fixed (polymerized), in the case of holographic recording film, by exposing it to ultraviolet light for a required period of time. This entire process, and especially if holographic recording film is utilized, lends itself very well to assembly line techniques. That is, continuous rolls of holographic recording film are passed through an exposure station, a polymerization station, a cutting station, etc., and then rerolled, or otherwise packaged for later use in an assembly line for manufacturing packages, such as those to be described presently. For additional information, see copending U.S. patent application entitled "Method of Manufacturing I/O Node in an Optical Channel Waveguide and Apparatus for Utilizing", Ser. No. 07/994,235, filed Dec. 21, 1992 and assigned to the same assignee.

In another embodiment, the gratings, specifically, can be formed by a method disclosed in U.S. Pat. No.

5,116,461, wherein the gratings are formed in an optical medium, such as quartz, glass, semiconductors, etc. and the gratings are etched in accordance with the process disclosed therein. Also, in a somewhat different embodiment, a blazed dielectric grating can be used.

Referring to FIG. 3, a view in top plan is illustrated, portions thereof broken away, including the optic array 30 of FIG. 2. Portions of the optic array, specifically diffraction elements 35, have been removed to better illustrate the construction thereof. A first cladding layer 37 and a second cladding layer 38 are positioned to define a plurality of parallel spaced apart grooves 39 therebetween. In this specific embodiment, a third cladding layer 42 is affixed to the exposed surface of second cladding layer 38 so as to define another plurality of parallel spaced apart grooves 43 therebetween. Also, a fourth cladding layer 44 is affixed to the exposed surface of third cladding layer 42 so as to define another plurality of parallel spaced apart grooves 45 therebetween. As explained above, grooves 39, 43 and 45 are filled with a material that forms a waveguide core. Thus, first, second and third parallel spaced apart rows of optical waveguides are provided.

As explained above, in an alternate embodiment, the cores are molded first and suspended in a larger mold. The larger mold is then filled with cladding material so as to form a single cladding layer surrounding all three rows of cores. Also, it will be understood that individual rows can be formed in this alternate fashion and assembled into the structure illustrated. When pluralities of cladding layers are utilized, the layers are assembled by utilizing alignment keys 48, or the like, which are molded into the cladding layers to provide the required accuracy.

Figure 5:
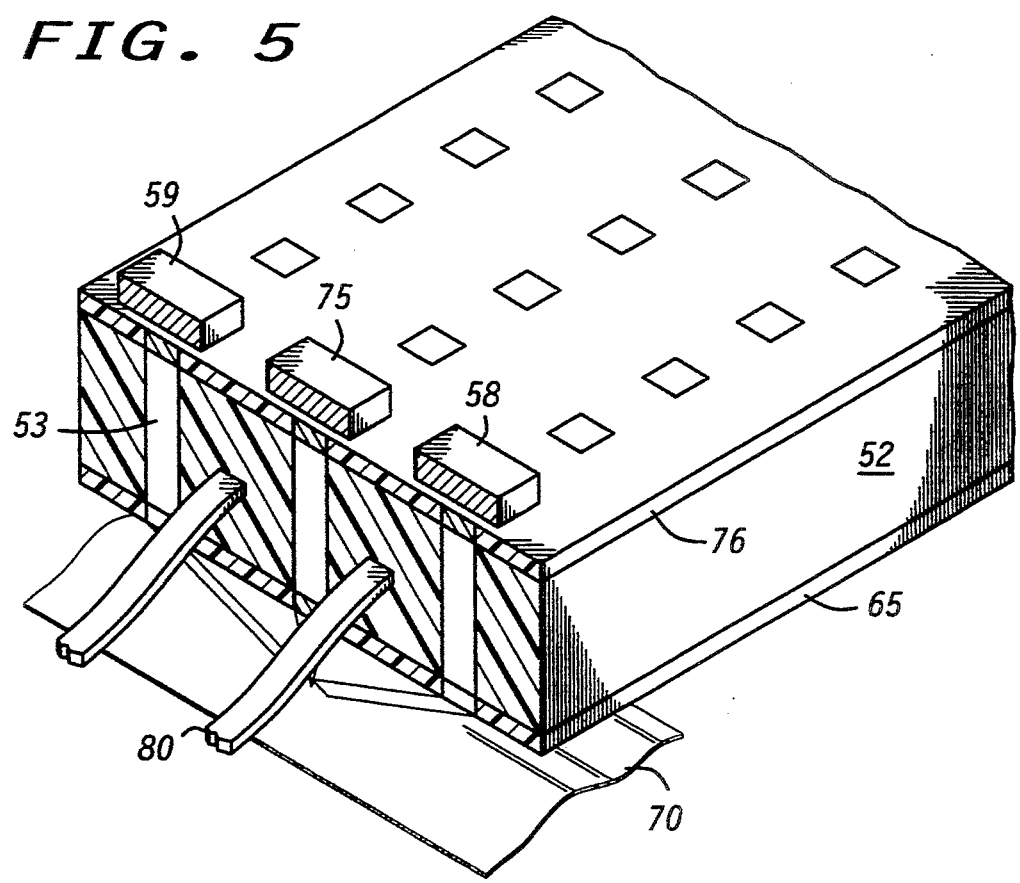
FIG. 5 is a view in perspective of the read/write head of FIG. 4, portions thereof removed to better illustrate the construction.

FIG. 4 is a cross-sectional view of a read/write head 50 incorporating an optic array similar to that of FIG. 2, in accordance with the present invention. Read/write head 50 is designed for use in facsimile machines and the like. Head 50 includes a layer 52 of cladding material, which may be a plurality of layers or a unitary layer, as previously described. Layer 52 defines a plurality of channels which are filled with cores 53, to form a plurality of optical waveguides. The plurality of waveguides are arranged in three parallel spaced apart rows, as illustrated in FIG. 5. Because FIG. 4 is a cross-sectional view, only a single waveguide in each row is illustrated, which single waveguides are designated 55, 56 and 57.

Waveguides 55 and 57 are positioned on opposite sides of waveguide 56. Each waveguide 55 and 57 has a light generating device 58 and 59, respectively, mounted adjacent a first end thereof so as to direct generated light into the waveguides. Light generating devices 58 and 59 may be, for example, vertical cavity lasers, side emitting lasers, light emitting diodes, etc. Diffractive elements 62 and 63 are mounted in overlying relationship to the opposite ends of waveguides 55 and 57, respectively. In this specific embodiment, diffractive elements 62 and 63 are diffractive gratings formed in a layer 65 of holographic material. Each diffractive element 62 and 63 includes upper and lower parallel input/output (I/O), spaced apart surfaces. A plurality of gratings are formed in the layer so as to extend between the upper and lower I/O surfaces and form a predetermined angle therewith. As explained above, the gratings are formed by exposing a holographic recording film to an interference pattern of light, which light is directed at one of the I/O surfaces at the predetermined angle. The holographic recording film is then cured, for example by exposing it to ultraviolet light. Thus, light emanating from the cores 53 of waveguides 55 and 57 is diffracted by diffractive elements 62 and 63 at the predetermined angle of the gratings. In this specific embodiment the angle of the gratings is approximately 45 degrees, although other angles might be utilized in specific embodiments.

The diffracted light from diffractive elements 62 and 63 is directed onto the surface of an image or document 70, which is spaced a short distance from read/write head 50. Because of the angle at which the diffracted light strikes document 70, the light is reflected back into core 53 of waveguide 56. The end of waveguide 56 which receives the reflected light has a diffractive element 72 positioned in overlying relationship thereto. The opposite end of waveguide 56 also has a diffractive element 73 positioned in overlying relationship thereto. Diffractive elements 72 and 73 cooperate to provide the reflected light to a light detector 75. For example, diffractive element 72 is designed to substantially collimate the reflected light as it enters core 53 of waveguide 56 and diffractive element 73 focuses the collimated light onto a light input of light detector 75. In general, the collimating and focusing is performed by lenses, which in this specific example are Fresnel lenses. As in the case of the gratings, lenses are produced in holographic recording film by exposing the film to interfering light rays. In some instances and in specific applications it may not be necessary to provide diffractive elements 72 and 73 at each end of waveguide 56.

Referring to FIG. 5, only light sources 58 and 59 and light detector 75 are illustrated in position over waveguides 55, 56 and 57. It should be understood, however, that each set of three waveguides forming columns parallel with and spaced from waveguides 55, 56 and 57 have similar components associated therewith. Thus, each waveguide in the two rows of waveguides containing waveguides 55 and 57 has a light source, or light source array (not shown) associated therewith and each waveguide in the row of waveguides containing waveguide 56 has a light detector, or light detector array (not shown) associated therewith. Each column of waveguides, i.e., waveguides 55, 56 and 57, forms a pixel or element of the line of information for the facsimile machine.

While the electrical connections to each light source and light detector may be provided in a variety of ways, in this specific embodiment a leadframe 80 is embedded in cladding layer 52 at the time of molding. Additional details as to this molding process are provided in a U.S. patent application entitled "Optical Waveguide with Contacts Utilizing Leadframes", bearing Ser. No. 07/920,073, filed Jul. 27, 1992, now U.S. Pat. No. 5,271,083 and assigned to the same assignee. Diffractive element 73 is formed in a holographic recording film 76, which also include conductive feedthroughs (vias) 82. Feedthroughs 82 may simply be openings formed through film 76 or may be conductive material positioned therein. Light sources 58 and 59 and light detector 75 are then electrically and physically attached to leadframe 80 and/or feedthroughs 82 by bump soldering, conductive epoxy, or the like.

Figure 6:
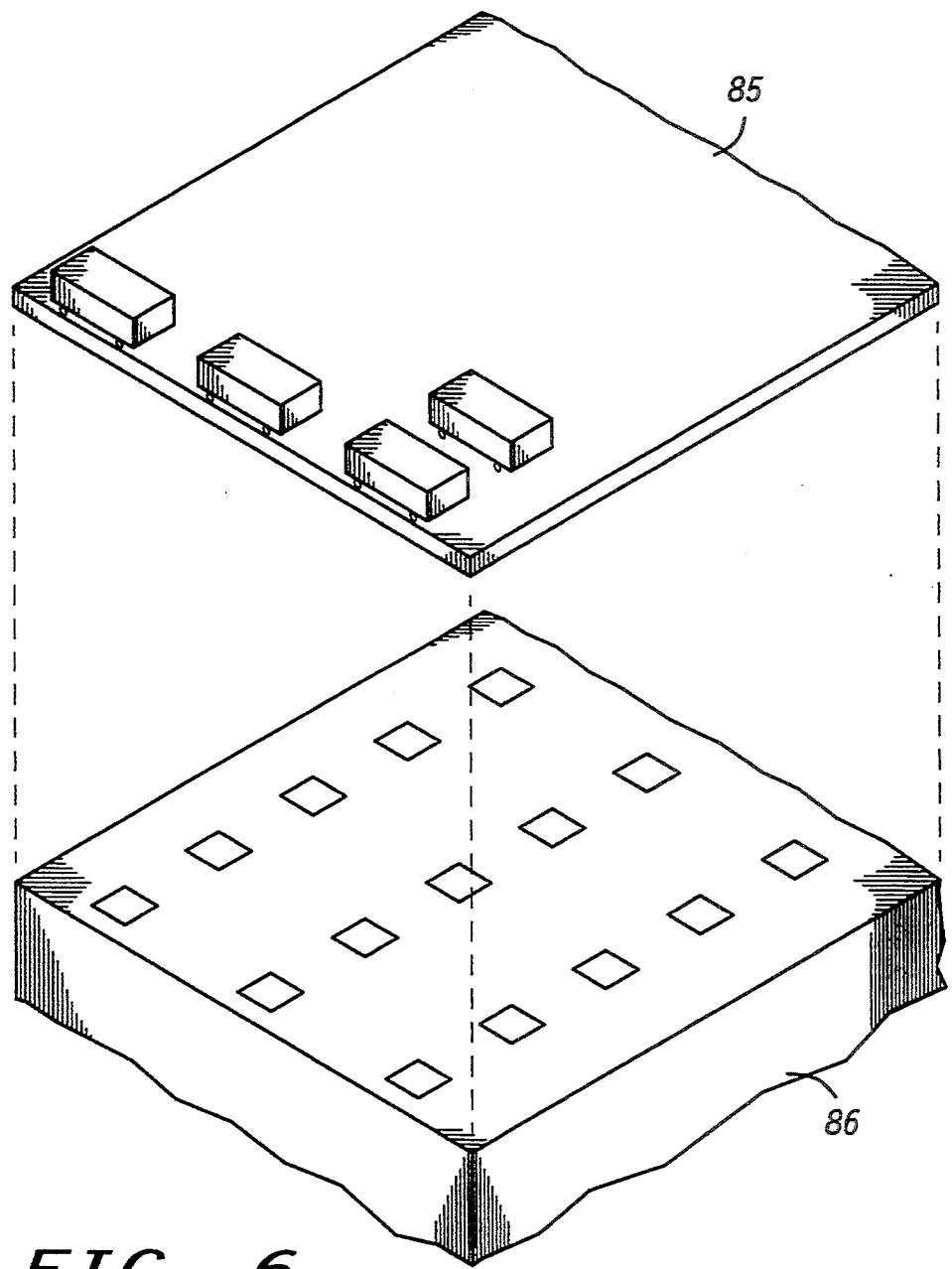
FIG. 6 is a partial exploded view in perspective illustrating another embodiment.

Thus, the entire read/write head 80 is manufactured utilizing components which are relatively easily molded and assembled. The entire manufacturing procedure is easily adaptable to automatic assembly line and/or robotic assembly techniques. In fact, in another embodiment, illustrated in FIG. 6, electrical connections and diffractive elements are included in a single flexible sheet 85 of light transmissive material, such as Kapton tape. Light sources and light detectors are then mounted directly onto sheet 85 and sheet 85 is positioned on the surface of a cladding layer 86 by utilizing alignment keys or the like. In this way the assembly is even more adaptable to automatic assembly lines and the like.

Figure 7:
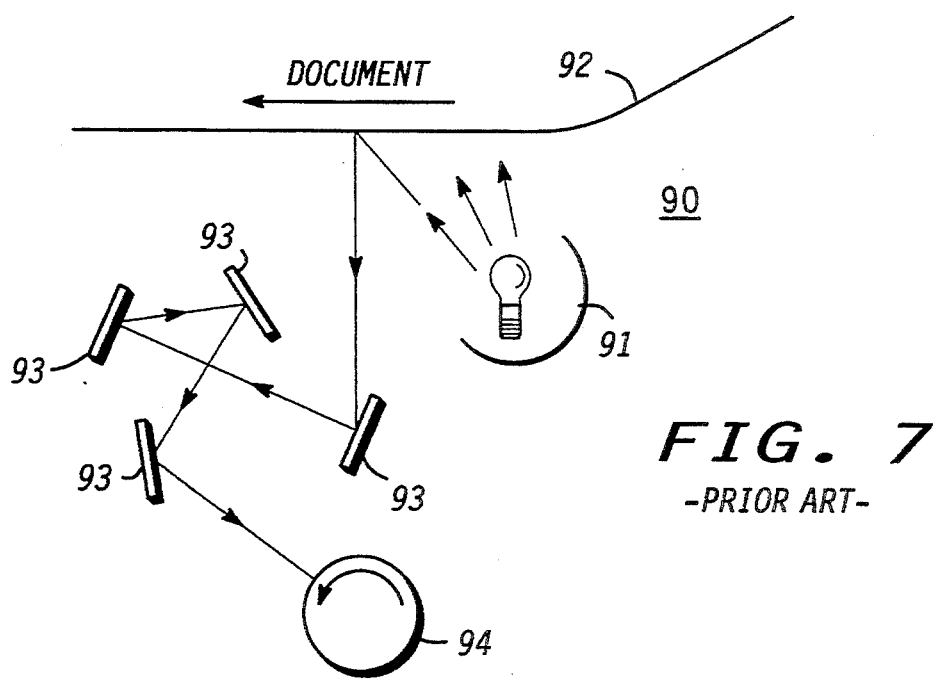
FIG. 7 is a simplified schematic view of a typical copy machine.

Referring specifically to FIG. 7, a simplified schematic view of a typical copy machine 90 is illustrated. Copy machine 90 includes a light 91 that directs light onto a document 92, to be copied. The light is reflected and collimated by several mirrors and lenses 93 onto a rotating photosensitive drum 94. As is known in the art, the light produces a charge on the surface of photosensitive drum 94. Photosensitive drum 94 is then rotated into close proximity to a powdered printing material (not shown), which is attracted to the surface of photosensitive drum 94 so as to form an image of document 92. The attracted printing material is then transferred to a sheet of plain paper and fixed thereon, by some means such as pressure, so that an image of document 92 is permanently formed on the plain sheet of paper. The problem here is that mirrors and lenses 93 require a large amount of space and they are difficult and expensive to manufacture and mount.

Figure 8:
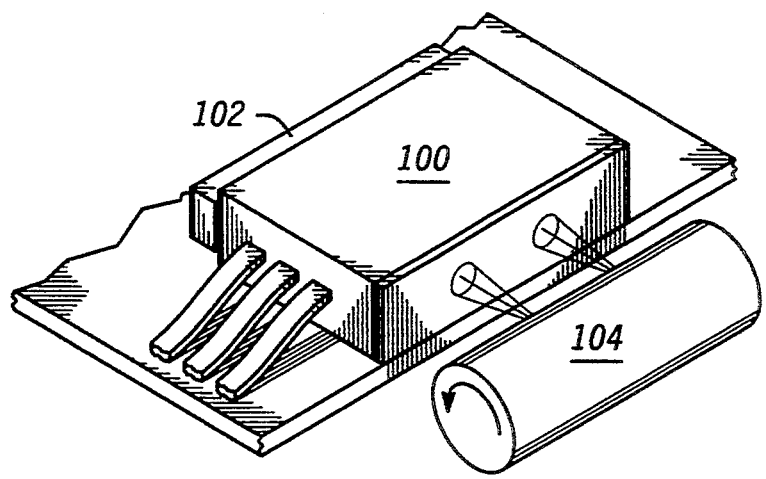
FIG. 8 is a view in perspective of portions of a copy machine utilizing an optic array similar to that of FIG. 2.

FIG. 8 is a view in perspective of portions of a copy machine utilizing an optic array 100 similar to that of FIG. 2. Optic array 100 includes a row of optical waveguides having diffractive elements at one or both ends, generally as illustrated in FIG. 2. In the embodiment illustrated in FIG. 8, an array of light sources 102 is positioned at one end of optic array 100 to provide the light for charging a photosensitive drum 104. Each light source of array 102 is controlled electronically to produce a predetermined image on the surface of photosensitive drum 104. In this specific embodiment, if the light sources in array 102 are, for example, vertical cavity surface emitting lasers (VCSELs) the collimating lens at the light input ends of optic array 100 can be eliminated because VCSELs produce substantially collimated light.

In another embodiment, array of light sources 102 is removed and optic array 100 is utilized in copy machine 90 to replace mirrors and lenses 93. Thus, light from light source 91 which is reflected from document 92 is received directly in one end of optical array 100 and directed by optical array 100 onto the surface of drum 94. It will of course be understood from the present disclosure that light source 91 can also be replaced and a read/write head similar to read/write head 50 of FIG. 4 can be utilized. In this fashion the size of typical copy machine 90 is substantially reduced and the manufacture is simplified.

Thus, a new and improved read/write head for facsimile machines, copy machines and the like has been disclosed. Further, the new and improved read/write head is simpler, more efficient and more reliable to manufacture and, in fact, can be manufactured by utilizing automatic assembly line and/or robotic procedures. Because of the simplified manufacturing and assembly techniques, the new and improved read/write head is much more inexpensive to manufacture and requires less, or no, manual labor.

While we have shown and described specific embodiments of the present invention, further modifications and improvements will occur to those skilled in the art.

We desire it to be understood, therefore, that this invention is not limited to the particular forms shown and we intend in the append claims to cover all modifications that do not depart from the spirit and scope of this invention.

What is claimed is:

1. An optical read/write head comprising:
   a cladding layer array defining a first plurality of parallel, spaced apart channels therethrough, the cladding layer array including first and second cladding layers positioned in abutting engagement and defining the first plurality of parallel, spaced apart channels therebetween, each channel containing an optical core and forming with the cladding layer array a first plurality of parallel optical waveguides, the first plurality of optical waveguides being positioned in a first row and the cladding layer array further including a third cladding layer defining in conjunction with the second cladding layer a second plurality of parallel, spaced apart channels, each of the second plurality of channels containing an optical core and forming with the second and third cladding layers a second plurality of parallel optical waveguides, and the second plurality of optical waveguides being positioned in a second row parallel with and spaced from the first row, the cladding layers and optical cores defining first and second ends with an optical input/output surface for each optical core positioned in each of the first and second ends; and
   diffraction elements positioned in overlying relationship with the optical input/output surfaces for each optical core in at least one of the first and second ends.

2. An optical read/write head as claimed in claim 1 wherein the diffraction elements include a diffraction grating.

3. An optical read/write head as claimed in claim 1 wherein the diffraction elements include a holographic optical element.

4. An optical read/write head as claimed in claim 1 wherein the diffraction elements include a holographic lens at one of the first and second ends of each optical waveguide and a diffraction grating at the other of the first and second ends of each optical waveguide in the first plurality of optical waveguides.

5. An optical read/write head as claimed in claim 1 further including a fourth cladding layer defining in conjunction with the third cladding layer a third plurality of parallel, spaced apart channels, each of the third plurality of channels containing an optical core and forming with the cladding layers a third plurality of parallel optical waveguides, and the third plurality of optical waveguides being positioned in a third row parallel with and spaced from the second and third rows.

6. An optical read/write head as claimed in claim 5 wherein the diffraction elements include a layer of holographic material affixed to the at least one of the first and second ends with a portion of the layer including a plurality of diffraction gratings formed therein for angularly diffracting light emanating from the optical waveguide.

7. An optical read/write head as claimed in claim 1 further including a plurality of light generators positioned adjacent the first ends of the optical waveguides to introduce light therein and wherein the diffractive elements are positioned to focus light leaving the second end of each optical waveguide.

8. An optical read/write head as claimed in claim 7 wherein the diffractive elements are formed in a layer of holographic material positioned in overlying relationship on the first ends and the light generators are affixed to the layer.

9. An optical read/write head as claimed in claim 8 including in addition a second layer of holographic material positioned in overlying relationship with the second end and including diffractive elements for focusing light emanating from the second ends of each of the optical waveguides.

10. An optical read/write head for facsimile machines and the like comprising:
- a plurality of optical waveguides each including a cladding layer defining a channel therethrough and each channel containing an optical core, the cladding layers and optical cores defining first and second ends with an optical input/output surface for each optical core positioned in each of the first and second ends;
- the plurality of optical waveguides being arranged into first and second parallel, spaced apart rows;
- a plurality of light detectors positioned between the first and second rows and further positioned to receive focused light from a predetermined line of an image positioned adjacent thereto;
- light generating means positioned to introduce light into the first end of each optical waveguide in the first and second rows; and
- a layer of material incorporating diffraction gratings therein being positioned in overlying relationship to the second end of each optical waveguide in the first and second rows, the diffraction gratings being positioned to diffract light emanating from each waveguide onto the predetermined line of the image at an angle to reflect light from the predetermined line onto the plurality of light detectors.

11. An optical read/write head for facsimile machines and the like as claimed in claim 10 wherein the light detecting means include a third row of optical waveguides positioned intermediate between the first and second rows, the plurality of optical waveguides being interposed between the first and second rows and in juxtaposition thereto, a diffractive element being positioned in overlying relationship to at least one of the first and the second ends of each optical waveguide in the third row, the diffractive elements being positioned to focus light entering the second end of each optical waveguide in the third row and leaving the first end, the second ends being positioned to receive light reflected from the predetermined line of an image positioned adjacent the second end of the plurality of optical waveguides in the third row, and the plurality of light detectors being positioned to receive focused light from the first ends of the third row of optical waveguides.

12. An optical read/write head for facsimile machines and the like as claimed in claim 11 wherein a second diffractive element is positioned over the other of the first and second ends of each of the plurality of waveguides in the third row.

13. An optical read/write head for facsimile machines and the like as claimed in claim 11 wherein the diffractive elements include a layer of holographic material.

14. An optical read/write head for facsimile machines and the like comprising:
- a plurality of optical waveguides each including a cladding layer defining a channel therethrough and each channel containing an optical core, the cladding layers and optical cores defining first and second ends with an optical input/output surface for each optical core positioned in each of the first and second ends;
- the plurality of optical waveguides being arranged into first, second and third parallel, spaced apart rows with the third row being interposed between the first and second rows and in juxtaposition thereto;
- layers of holographic material positioned in overlying relationship to the first and the second ends of each optical waveguide in the third row, the layers including diffraction elements positioned to focus light entering the second end of each optical waveguide in the third row and leaving the first end, the second ends being positioned to receive light reflected from a predetermined line of an image positioned adjacent the second end of the plurality of optical waveguides in the third row;
- a plurality of light detectors positioned to receive focused light from the first end of each optical waveguide in the third row;
- light generating means positioned to introduce light into the first end of each optical waveguide in the first and second rows; and
- a layer of material incorporating diffraction gratings therein being positioned in overlying relationship to the second end of each optical waveguide in the first and second rows, the diffraction gratings being positioned to diffract light emanating from each waveguide in the first and second rows onto the predetermined line of the image at an angle to reflect light from the predetermined line into the second end of each optical waveguide in the third row.

15. An optical read/write head for facsimile machines and the like as claimed in claim 14 wherein the diffraction gratings are positioned in the layer of material to diffract light at an angle of approximately 45 degrees.

* * * * *